United States Patent [19]

Hamprecht

[11] 3,919,308

[45] Nov. 11, 1975

[54] BETA-HALOALKYLAMINOSULFONYL HALIDES AND THEIR PRODUCTION

[75] Inventor: Gerhard Hamprecht, Mannheim, Germany

[73] Assignee: BASF Aktiengesellschaft, Ludwigshafen (Rhine), Germany

[22] Filed: Jan. 8, 1974

[21] Appl. No.: 431,702

[30] Foreign Application Priority Data
Jan. 11, 1973 Germany............................ 2301207

[52] U.S. Cl............ 260/543 R; 260/543 F; 71/103
[51] Int. Cl.$^2$.............. C07C 143/155; C07C 143/21
[58] Field of Search...................... 260/543 R, 543 C

[56] References Cited
FOREIGN PATENTS OR APPLICATIONS
1,943,233    3/1971    Germany....................... 260/543 R

*Primary Examiner*—Robert Gerstl
*Assistant Examiner*—Richard D. Kelly
*Attorney, Agent, or Firm*—Johnston, Keil, Thompson & Shurtleff

[57] ABSTRACT

The production of β-haloalkylaminosulfonyl halides by the reaction of an aziridine with a sulfuryl halide, and the new β-haloalkylaminosulfonyl halides themselves. The products are starting materials for the production of plant protection agents, dyes and pharmaceuticals.

7 Claims, No Drawings

BETA-HALOALKYLAMINOSULFONYL HALIDES AND THEIR PRODUCTION

The invention relates to a process for the production of β-haloalkylaminosulfonyl halides by reaction of an aziridine with a sulfuryl halide.

It is known that N-alkylamidosulfonyl chlorides can be prepared by reaction of monoalkyl ammonium chlorides with sulfuryl chloride (Acta chem. Scand. 17 (1963), 2141). In carrying out the reaction in the presence of a strongly polar organic solvent and adding a metal halide as catalyst the yields can be improved by the method described in German Pat. No. 1,242,627. While the method gives good yields for lower linear alkylamidosulfonyl chlorides there is a considerable decrease in the yields with branching and increasing chain length of the alkyl radical. Moreover haloalkylaminosulfonyl halides cannot be prepared by this method. The long reaction period of the method which is necessary for a satisfactory yield is a disadvantage. On an industrial scale this method gives rise to processing problems, and environmental problems also arise because of the high chlorine content of the byproducts. A process for the production of β-chloroethylaminosulfonyl fluoride by exchange of halogen in the appropriate aminosulfonyl chloride with hydrogen fluoride under pressure is disclosed in German Laid-Open Specification (DOS) No. 1,943,233. The process is unsatisfactory, especially on an industrial scale, in regard to simplicity and economy because of the reaction conditions and the two-stage operation by way of the sulfonyl chloride.

It is an object of the invention to provide novel β-haloalkylaminosulfonyl halides.

Another object of this invention is a process for producing β-haloalkylaminosulfonyl halides in good yields and high purity in a simpler and more economical manner.

We have found that a β-haloalkylaminosulfonyl halide of the formula (I):

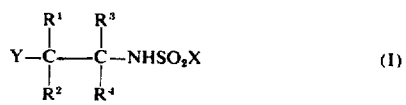

in which
the individual radicals $R^1$ to $R^4$ may be identical or different and each is hydrogen or an aliphatic, araliphatic or aromatic radical;

$R^1$ and $R^3$ or $R^2$ and $R^4$ together with the two adjacent carbon atoms may be members of an alicyclic ring;
X is chlorine or fluorine; and
Y is chlorine or fluorine is advantageously obtained by reacting an aziridine of the formula (II):

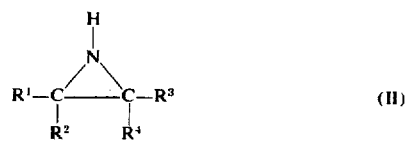

in which $R^1$, $R^2$, $R^3$ and $R^4$ have the above meanings with a sulfuryl halide of the formula (III):

in which X and Y have the above meanings.

When ethylenimine and sulfuryl chloride are used the reaction may be represented as follows:

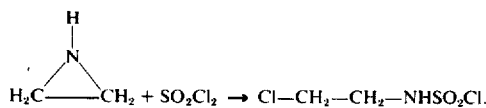

The process gives β-haloalkylaminosulfonyl halides in a good yield and high purity in a simpler and more economical way than prior art methods. The reaction period is shorter and the processing of the reaction mixture is simpler and safer, e.g. in regard to the protection of the environment. The process may be carried out without the use of superatmospheric pressure. Starting materials (II) with alkyl groups containing more carbon atoms may be reacted by the process of the invention. All these advantageous results are surprising having regard to the prior art.

Preferred starting materials (II) and (III) and consequently preferred end products (I) are those in whose formulae the individual radicals R are identical or different and each is hydrogen, linear or branched alkyl of from one to twenty, particularly from one to eight and preferably from 1 to 3 carbon atoms, aralkyl of 7 to 12 carbon atoms or phenyl and $R^1$ and $R^3$ (and/or $R^2$ and $R^4$) together with the two adjacent carbon atoms are members of a five-membered to eight-membered alicyclic ring and particularly a cyclohexyl or cyclopentyl ring, X is chloro or fluoro and Y is chloro or fluoro. The said radicals may bear (as substituents) groups and/or atoms which are inert under the reaction conditions, for example chlorine atoms, fluorine atoms, bromine atoms, nitro groups, cyano groups, alkyl groups of one to four carbon atoms, or carbalkoxy groups of two to four carbon atoms. When the starting material (III) is a sulfuryl halide which contains both chlorine and fluorine as the halogen the corresponding β-chloroalkylaminosulfonyl fluorides are usually obtained. In the case of starting materials (II) which are unsymmetrically substituted (in which the meaning of $R^1$ does not correspond to that of $R^3$ and that of $R^2$ does not correspond to that of $R^4$) mixtures of the two isomeric end products (I) are obtained:

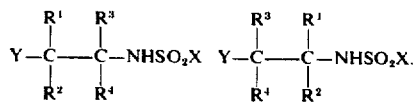

The starting material (II) may be reacted with the sulfuryl halide (III) in a stoichiometric amount or with an excess of sulfuryl halide (III), preferably in a ratio of from 2 to 4 moles of sulfuryl halide (III) per mole of starting material (II).

Examples of suitable aziridines (II) are: ethylenimine, 1-cyanoethylenimine, 1,2-propylenimine, 1,2-butylenimine, 5-chloro-1,2-pentylenimine, 1,2-hexylenimine, 1,2-heptylenimine, 2,3-butylenimine, 2,3-pentylenimine, 2,3-hexylenimine, 2-methyl-3,4-pentylenimine, 3,4-hexylenimine, 3,4-heptylenimine, 2- methyl-1,2-propylenimine, 2-methyl-1,2-butylenimine, 2-ethyl-1,2-butylenimine, 2-methyl-2,3-butylenimine, 3-methyl-2,3-pentylenimine, 2-methyl-2,3-pentylenimine, 2,3-dimethyl-2,3-butylenimine, 1-benzylethylenimine, 1-phenylethylenimine, 1-phenyl-1,2-propylenimine, 2-p-chlorophenyl-1,2-propylenimine, 2-o-cyanophenyl-1,2-propylenimine, 2-p-nitrophenyl-1,2-propylenimine, 7-azabicyclo-[4,1,0]-heptane and 6-azabicyclo-[3,1,0]-hexane.

Sulfuryl chloride, sulfuryl chlorofluoride and sulfuryl fluoride are starting materials of formula (III).

The reaction is carried out as a rule at a temperature of from −65° to +110°C at atmospheric or superatmospheric pressure, continuously or batchwise. A temperature of from −40° to 100°C and particularly from −10° to 50°C is preferred when using sulfuryl chloride, a temperature of from −30° to +35°C and particularly from −20° to +10°C in the case of using sulfuryl chlorofluoride, and a temperature of from −60° to +30°C and particularly from −60° to −40°C when using sulfuryl fluoride. In the two latter cases a temperature of 0° to 30°C in pressure apparatus is also advantageous.

The reaction is conveniently carried out in starting material (III) in an organic solvent which is inert under the reaction conditions. Particularly suitable solvents are chlorinated aliphatic hydrocarbons such as methylene chloride, chloroform, carbon tetrachloride, 1,1,-dichloroethane, 1,2-dichloroethane, 1,1,1-trichloroethane, 1,1,2-trichloroethane, 1,1,2,2-tetrachloroethane, 1,1,1,2-tetrachloroethane, n-propyl chloride, n-butyl chloride, s-butyl chloride, isobutyl chloride; chlorinated aromatic hydrocarbons such as chlorobenzene, bromobenzene, o-dichlorobenzene, m-dichlorobenzene, p-dichlorobenzene, o-dibromobenzene, m-dibromobenzene, o-chlorotoluene, m-chlorotoluene, p-chlorotoluene, 1,2,4-trichlorobenzene; nitrohydrocarbons such as nitrobenzene, nitromethane, nitroethane, o-chloronitrobenzene, m-chloronitrobenzene, p-chloronitrobenzene; aliphatic and cycloaliphatic hydrocarbons such as hexane, petroleum ether, cyclohexane, pentane, heptane; preferably nitriles such as acetonitrile, propionitrile, butyronitrile, isobutyronitrile, benzonitrile, o-chlorobenzonitrile, m-chlorobenzonitrile, p-chlorobenzonitrile; or ethers such as diethyl ether, dipropyl ether or liquefied sulfur dioxide; or appropriate mixtures. The solvent and the starting material (III) are generally used in amounts of from 200 to 1200% by weight based on starting material (II).

The reaction may be carried out as follows: a mixture of starting material (II) and a sulfuryl halide, with or without a solvent, is kept for half an hour to 8 hours at the reaction temperature. In an advantageous embodiment a mixture of starting material (II) and solvent is supplied through a feed means at from −10° to 10°C to a mixture of starting material (III) and solvent; when sulfuryl fluoride is used as starting material (III) the addition is conveniently carried out at from −60° to −48°C. The starting material (III) mixed with solvent and the starting material (III) mixed with solvent may also be united by uniform supply through a reflux condenser cooled with brine and the reaction mixture collected in the solvent receiver. After the components have been united the mixture is stirred advantageously for another 10 to 30 minutes at the temperatures at which it is supplied, heated with 10 to 30 minutes to ambient temperature and then stirred for another 20 to 30 minutes at 30° to 40°C. When sulfuryl chloride is used as starting material (III) it is convenient to continue stirring at −55° to −45°C for from 2 to 8 hours. The end product (I) is separated from the reaction mixture by a conventional method, for example by fractional distillation.

When using sulfuryl fluoride it may be advantageous to increased the reaction rate by adding a Lewis acid as a catalyst, advantageously in an amount of from 0.01 to 0.04 mole per mole of starting material (II). Lewis acids in the present context are electrophilic substances having incomplete electron configuration which can absorb one electron pair of a base. Houben-Weyl, "Methoden der organischen Chemie", volume 4/2, page 6 and Rodd, "Chemistry of Carbon Compounds", volume IA, page 103 (Elsevier Publishing Co., N.Y. 1951) are referred to for a definition of Lewis acids. Halides of metals of groups 2 to 6 of the Periodic Table such as zinc, boron, aluminum, tin, titanium, antimony, bismuth, molybdenum or tungsten chloride, aluminum bromide and boron trifluoride may conveniently be used as Lewis acids. The Lewis acids may also be used in the form of their complexes, for example boron trifluoride etherate, dihydrate; ethyl alcoholate and other alcoholates; fluoboric acid, boron fluoride acetic acid, diacetic acid or phosphoric acid; boron trichloride complex compounds with phosphorus trichloride and phosphorus oxychloride. Arsenic-(III) and arsenic(V) fluoride, antimony(III) and antimony(V) fluoride are preferred as catalysts.

The compounds which can be prepared by the process of the invention are valuable starting materials for the production of plant protection agents, dyes and pharmaceuticals. Thus for example the o-sulfamidobenzoates described in German pat. application no. P 21 04 682.2 may be prepared therefrom by reaction with anthranilic acid or a salt thereof. By cyclization of these substances, for example according to the methods described in German patent application no. P 21 05 687.1, the 3-(β-halo)-alkyl-2,1,3-benzothiadiazin-4-one-2,2-dioxides are obtained whose halogen may be replaced by hydrogen, for example by means of lithium aluminum hydride and which results in derivatives whose use as plant protection agents and pharmaceuticals is described in the same patent. Belgian Pat. Nos. 757,886 and 702,877 and German Pat. No. 1,120,456 disclose further uses. The herbicides described in German patent application no. P 22 01 432.0 are similarly obtainable from the end products according to the invention by reaction with glycolic acid anilides. There may also be obtained from the end products (I) by hydrolysis the corresponding haloamines which are starting materials of chemotherapeutic drugs for controlling cancer and tumors (Ullmanns Encyklopadie der technischen Chemie, volume 10, pages 773 et seq.). N-halosulfamoyl hydrazones and N,N-bis-(β-haloalkyl)sulfamoyl hydrazones which are effective against sarcoma and carcinoma are obtained from the end products by the methods described in Arzeimittelforschung 12 (1962), pages 1119 et seq.

The end products (I) are themselves herbicidal and are suitable for destroying cockspur panicum; the following are particularly effective:

1-chloropropyl-(2)-aminosulfonyl chloride,
2-chloropropyl-(3)-aminosulfonyl chloride,
2-chloro-2-methylpropyl-(3)-aminosulfonyl chloride;
1-chlorobutyl-(2)-aminosulfonyl chloride;
2-chlorobutyl-(3)-aminosulfonyl chloride;
2-chlorocyclohexylaminosulfonyl chloride;

1-chloropropyl-(2)-aminosulfonyl fluoride;
2-chloropropyl-(3)-aminosulfonyl fluoride;
1-chlorobutyl-(2)-aminosulfonyl fluoride;
2-chloro-2-methylpropyl-(3)-aminosulfonyl fluoride;
2-chlorobutyl-(3)-aminosulfonyl fluoride;
1-fluoroethyl-(2)-aminosulfonyl fluoride;
1-fluoropropyl-(2)-aminosulfonyl fluoride;
2-fluoropropyl-(3)-aminosulfonyl fluoride;
1-fluorobutyl-(2)-aminosulfonyl fluoride;
3-fluorobutyl-(4)-aminosulfonyl fluoride;
2-fluoro-2-methylpropyl-(3)-aminosulfonyl fluoride; and
2-fluorobutyl-(3)-aminosulfonyl fluoride.

New end products (I) which are preferred in this context are β-haloalkylaminosulfonyl halides of the formula:

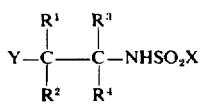  (I)

in which the individual radicals $R^1$, $R^2$, $R^3$ and $R^4$ are identical or different and each is alkyl of 1 to 3 carbon atoms, aralkyl or 7 to 12 carbon atoms or phenyl; three of radicals $R^1$ to $R^4$ may also be hydrogen; moreover $R^1$ and $R^3$ and/or $R^2$ and $R^4$ together with the two adjacent carbon atoms may be members of a five-membered to eight-membered alicyclic ring, X and Y may be identical or different and each is a chlorine or fluorine atom, moreover the radicals $R^1$, $R^2$, $R^3$ and $R^4$ may all be hydrogen at the same time and X and Y may both be fluorine atoms, and particularly the abovementioned individual halides (I). Among the preferred end products β-haloalkylaminosulfonyl halides of the formula (I) in which the individual radicals $R^1$ to $R^4$ are identical or different and each is alkyl of one or two carbon atoms, X and Y are identical or different and each is chlorine or fluorine and moreover three of the radicals $R^1$ to $R^4$ may be hydrogen are particularly advantageous. The compounds have herbicidal action and are suitable for destroying cockspur panicum.

The following Examples illustrate the invention. Parts are parts by weight.

EXAMPLE 1 a. 86 parts of ethylamine in 200 parts of acetonitrile (stabilized with 2 parts of sodium hydroxide) is introduced into a solution of 540 parts of sulfuryl chloride in 400 parts of acetonitrile at 0° to 10°C. The reaction mixture is slowly heated to room temperature and stirred for another 30 minutes at 35°C. After excess sulfuryl chloride has been removed the colorless residue is distilled. 232 parts (65% of theory) of 2-chloroethylaminosulfonyl chloride is obtained having a boiling point of 102°C at 0.3 mm and $n_D^{25} = 1.4935$.

b. The reaction under (a) is carried out with diethyl ether instead of acetonitrile. 2-chloroethylaminosulfonyl chloride is obtained in the same yield and purity.

c. After 86 parts of ethylenimine in 100 parts of acetonitrile has been added to 540 parts of sulfuryl chloride in 800 parts of liquid sulfur dioxide the reaction is carried out analogously to Example 1(a) at −10°C followed by stirring for 1 hour at −10°C. 162 parts (45.5% of theory) of 2-chloroethylaminosulfonyl chloride is obtained with $n_D^{25} = 1.4942$ and a boiling point of 102°C at 0.3 mm.

The Examples 2 to 5 set out in Table I are carried out analogously to Example 1(a).

| Ex | Parts | Starting material | Parts | End product | | Boiling pt.(°C)/mm | $n_D^{25}$ |
|---|---|---|---|---|---|---|---|
| 2 | 342 | H-N⟨△⟩-CH₃ | 588 | Cl—CH—CH₂—NHSO₂Cl<br>     \|<br>     CH₃ | ClCH₂—CH—NHSO₂Cl<br>           \|<br>           CH₃<br>(22 : 78) | 94–96/0.01 | 1.4959 |
| 3 | 109 | H-N⟨△⟩-C₂H₅ | 133 | | Cl—CH₂—CH—NHSO₂Cl<br>            \|<br>            C₂H₅ | 96–104/0.01 | 1.4860 |
| 4 | 213 | H-N⟨△⟩(CH₃)(CH₃) | 253 | Cl—C(CH₃)(CH₃)—CH₂—NHSO₂Cl | | 86–91/0.05 | 1.4852 |
| 5 | 100 | H-N⟨△⟩(CH₃)(CH₃) | 121 | | Cl—CH—CH—NHSO₂Cl<br>     \|    \|<br>     CH₃ CH₃ | 74–93/0.05 | 1.4878 |

EXAMPLE 6

58.4 parts of 1,2-butylenimine in 80 parts of acetonitrile (stabilized with 2 parts of sodium hydroxide) is added at −10°C to 0°C within 30 minutes to a solution of 192 parts of sulfuryl chlorofluoride in 500 parts of acetonitrile. The mixture is stirred for 1 hour at from 0° to 5°C and half an hour at 30°C. After excess sulfuryl chlorofluoride and the solvent have been removed the residue is distilled in vacuo. 85.4 parts (55% of theory) of colorless 1-chlorobutyl-(2)-aminosulfonyl fluoride is obtained having a boiling point of 67 to 72°C at 0.3 mm and with $n_D^{25} = 1.4439$.

The reactions described in Examples 7 to 9 of Table II are carried out analogously to Example 6.

Table II

| Ex | Parts | Starting material | Parts | End Product | Boiling pt. °C/mm | $n_D^{25}$ |
|---|---|---|---|---|---|---|
| 7 | 25.6 | H-N (aziridine) | 38 | $Cl-CH_2-CH_2-NHSO_2F$ | 73–75/0.2 | 1.4363 |
| 8 | 46.7 | H-N (2-methylaziridine) | 56.2 | $Cl-CH-CH_2-NHSO_2F$ / $CH_3$    $Cl-CH_2-CH-NHSO_2F$ / $CH_3$  (15 : 85) | 71/0.05 | 1.4417 |
| 9 | 58.4 | H-N (2,2-dimethylaziridine) | 40.2 | $Cl-C(CH_3)_2-CH_2-NHSO_2F$    $Cl-CH_2-C(CH_3)_2-NHSO_2F$  (72 : 28) | 60–79/0.1 | 1.4519 |

EXAMPLE 10

58.4 parts of 2-methyl-1,2-propylenimine in 70 parts of acetonitrile (stabilized with 2 parts of sodium hydroxide) is introduced at −55°C into a mixture of 200 parts of sulfuryl fluoride and 5 parts of antimony(III) fluoride in 400 parts of acetonitrile within 20 minutes. The mixture is stirred for seven hours at −45°C. The cooling bath is then removed; the excess sulfuryl chloride evaporates. After the solvent has been removed the residue is distilled in vacuo. 74 parts (52% of theory) of 2-fluoro-2-methylpropyl-(3)-aminosulfonyl chloride is obtained with $n_D^{25} = 1.4040$ and a boiling point of 65° to 72°C at 0.1 mm.

50 parts of the crude product dissolved in 50 parts of 1,2-dichloroethane and 30.3 parts of triethylamine are added within ten minutes at 30°C to a solution of 13.7 parts of anthranilic acid in 175 parts of 1,2-dichloroethane. The mixture is stirred for two hours at ambient temperature and then it is exhaustively extracted with 2N caustic soda solution. The alkaline extract is washed with 40 parts of methylene chloride and then stirred into dilute hydrochloric acid. The product is redissolved in caustic soda solution and again precipitated with acid. 12.7 parts (38% of theory, based on anthranilic acid) of N-(2-chloro)cyclohexyl-N'-(o-carboxy)-phenyl sulfamide is obtained having a melting point of 110° to 113°C.

Table III

| Ex | Parts | Starting material | Parts | End product | Boiling pt. °C/mm | $n_D^{25}$ |
|---|---|---|---|---|---|---|
| 11 | 37.5 | H-N (aziridine) | 26.6 | $F-CH_2-CH_2-NHSO_2F$ | 73–75/10 | 1.3879 |
| 12 | 49.7 | H-N with CH₃ | 35 | $F-CH-CH_2-NHSO_2F$ / $CH_3$    $F-CH_2-CH-NHSO_2F$ / $CH_3$  (55 : 45) | 53–75/0.1 | 1.3929 |
| 13 | 58.4 | H-N with C₂H₅ | 41 | $F-CH-CH_2-NHSO_2F$ / $C_2H_5$    $F-CH_2-CH-NHSO_2F$ / $C_2H_5$  (60 : 40) | 62–79/0.2 | 1.4020 |
| 14 | 40 | H-N with CH₃, CH₃ (2,3-dimethyl) | 33.2 | $F-CH-CH-NHSO_2F$ / $CH_3$ $CH_3$ | 60–72/0.2 | 1.4002 |

EXAMPLE 15

48.6 parts of 7-azabicyclo-[4,1,0]-heptane in 160 parts of acetonitrile (stabilized with 1 part of sodium hydroxide) is added at 5° to 10°C to a solution of 135 parts of sulfuryl chloride in 80 parts of acetonitrile within twenty minutes while stirring. The reaction mixture is heated to ambient temperature during 20 minutes and stirred for 2 hours. Upon concentration 117 parts of crude 2-chlorocyclohexylaminosulfonyl chloride remains in the form of a viscous oil. To identify it

EXAMPLE 16

Oats, wheat and rye on a cultivated agricultural area which is strongly infested with panicum (*Echinochloa crus*galli) are treated at a growth height of 7 to 11 cm with 3 kg per hectare of the active ingredient 1-chlorobutyl-(2)-aminosulfonyl chloride dispersed in 6 liters of paraffin oil per hectare. The panicum is destroyed to the extent of 80% within a fortnight; oats, wheat and rye are not affected. The same result is obtained when the said plants are treated with the end products (I) specified in Examples 1 to 15.

I claim:

1. A process for the production of a β-haloalkylaminosulfonyl halide of the formula:

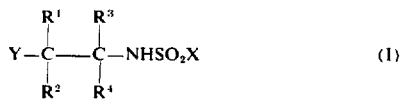  (I)

in which the individual radicals $R^1$, $R^2$, $R^3$ and $R^4$ may be identical or different and each is hydrogen or an aliphatic, araliphatic or aromatic radical, moreover $R^1$ and $R^3$ and/or $R^2$ and $R^4$ together with the two adjacent carbon atoms may form an alicyclic ring; and X and Y are chloro or X is fluoro and Y is chloro or fluoro, which process comprises reacting an aziridine of the formula:

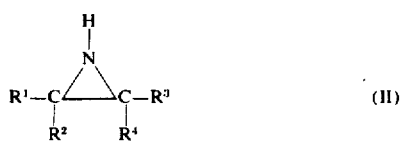  (II)

in which $R^1$, $R^2$, $R^3$ and $R^4$ have the said meanings, with a sulfuryl halide of the formula:

  (III)

in which X and Y have the above meanings.

2. A process as claimed in claim 1 wherein the reaction is carried out with from 2 to 4 moles of sulfuryl halide (III) for each mole of starting material (II).

3. A process as claimed in claim 1 wherein sulfuryl chloride is used and the reaction is carried out at a temperature of from −40° to +100°C.

4. A process as claimed in claim 1 wherein sulfuryl chlorofluoride is used and the reaction is carried out at a temperature of from −30° to +35°C.

5. A process as claimed in claim 1 wherein sulfuryl fluoride is used and the reaction is carried out at a temperature of from −60° to +30°C.

6. A process as claimed in claim 1 wherein the reaction is carried out in the presence of an organic solvent which is inert under the reaction conditions in an amount of from 200 to 1200% by weight based on the starting material (II).

7. A process as claimed in claim 1 wherein sulfuryl fluoride is used and the reaction is carried out with a Lewis acid as a catalyst.

* * * * *

UNITED STATES PATENT AND TRADEMARK OFFICE
CERTIFICATE OF CORRECTION

PATENT NO. : 3,919,308
DATED : November 11, 1975
INVENTOR(S) : Gerhard Hamprecht It is certified that error appears in the above-identified patent and that said Letters Patent are hereby corrected as shown below:

In Column 7, after " ... point of 65° to 72°C at 0.1 mm." insert --Examples 11 to 14 in Table III are carried out analogously.--

Signed and Sealed this

Fourteenth Day of September 1976

[SEAL]

Attest:

RUTH C. MASON
Attesting Officer

C. MARSHALL DANN
Commissioner of Patents and Trademarks